Figure 1:
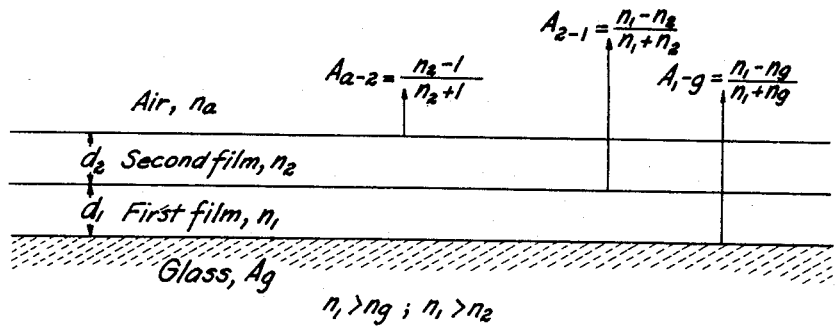
Figure 1:
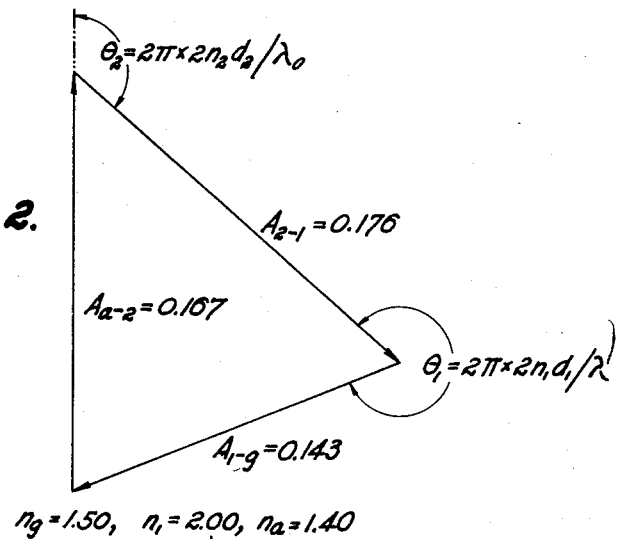
Figure 1:
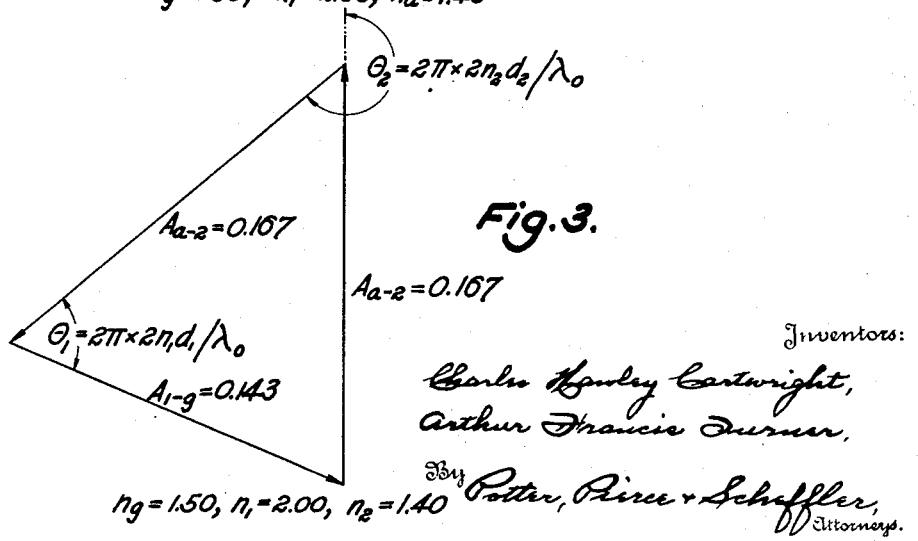

April 28, 1942.   C. H. CARTWRIGHT ET AL   2,281,474
TREATING SURFACES OF LIGHT-TRANSMITTING
ARTICLES, AND THE TREATED PRODUCTS
Filed March 20, 1939

Inventors:
Charles Hawley Cartwright,
Arthur Francis Turner,
By Potter, Pierce & Scheffler,
Attorneys.

Patented Apr. 28, 1942

2,281,474

UNITED STATES PATENT OFFICE 2,281,474

TREATING SURFACES OF LIGHT-TRANSMITTING ARTICLES, AND THE TREATED PRODUCTS

Charles Hawley Cartwright, San Gabriel, Calif., and Arthur Francis Turner, Newton, Mass., assignors to Research Corporation, New York, N. Y., a corporation of New York Application March 20, 1939, Serial No. 263,014

9 Claims. (Cl. 88—1)

This invention relates to the art of altering—for example substantially eliminating—the reflection of light from surfaces, and is concerned more particularly with the treatment of a surface of a light-transmitting article (e. g., a plate made of glass, celluloid, cellophane or resinous composition, a lens, a prism, or the like) whereby substantially to alter the reflection of light from such surface. The invention is concerned also with improved light-transmitting articles which have been treated in accordance with the process hereinafter disclosed and claimed.

An object of this invention is the provision of a process for the production of articles exhibiting very low or substantially no reflection, examples of such articles being lenses, prisms, plates or the like, made of glass, quartz, transparent plastic composition or similar substances.

Another object of the invention is to provide a process for treating lenses, prisms, and optical elements generally, whereby to render such elements practically non-reflective and to increase their utility in optical instruments such as fieldglasses, cameras, telescopes, microscopes, prism-binoculars, bomb-sights, periscopes and the like. Such instruments are eminently suitable for night work or when the object to be viewed is poorly illuminated.

A further object of the invention is to provide a process for treating plates or sheets of glass, plastic composition, and similar light-transmitting materials whereby substantially to alter the reflection from the surface of these articles. It is a particular object of the invention to so treat surfaces of light-transmitting articles as to confer upon the articles desirable properties from the standpoint of diminished reflectance.

A still further object is to provide improved articles having unique optical properties—particularly, articles which give little or no reflection. By substantially eliminating the reflection from lenses, prisms and such optical elements, improved optical instruments embodying these elements may be made. Substantial elimination of "ghost images" in complicated optical systems is made possible by the use of the articles of this invention.

In our copending application entitled "Process of decreasing reflection of light from surfaces, and articles so produced," Serial No. 247,974, filed December 27, 1938, now Patent No. 2,207,656, there is described a method of reducing the reflection of light from a surface of a light-transmitting article (e. g., of an optical element), which method consists essentially in providing over the article's surface—as by evaporation in an attenuated atmosphere—a film coating of a non-metallic substance, said film having certain defined characteristics. The conditions for zero reflection by the use of a single film are: (1) the optical thickness of the single film be $\lambda_0 4$, so that the two reflected amplitude vectors (see Patent No. 2,207,656, page 3, second column, line 22 et seq.) from the film and the interface be out of phase, and (2) the index of refraction of the film be the square root of that of the glass, so that the amplitudes of the two reflection vectors be equal in magnitude. The index of refraction of an evoporatively applied film of any material can be decreased by controlling the evaporating conditions, and it is possible by the use of a single film of practically any material to satisfy the above two conditions. However, decreasing the index of refraction below normal is accompanied by a decrease in the density, and thereby in the mechanical strength, of the film. The choice of inherently rugged single-film materials is very limited.

The basis of the present invention is our discovery that a material reduction in reflection approaching zero reflection can also be attained, without artificially reducing the index of refraction of the film materials, by the use of a plurality of light-transmitting films of different non-metallic solid materials so applied that the three or more reflected amplitude vectors add to zero. It is even possible with a double film to have the indices of both films higher than that of the glass itself and attain substantially zero reflection for a limited spectral region. The reduced reflection extends over a broader spectral region by the use of a relatively very high index film next to the glass and then a relatively low index film on top of it.

Some of the materials which we have tried for the high index film next to the glass (often on top of a very thin layer of chromium which had been exposed to air) are: arsenic sulphide ($As_2S_5$), antimony sulphide ($Sb_2S_3$), zinc sulphide, aluminum oxide, titanium oxide, corundum, iron oxide, carborundum, and tin oxide. Films of these materials were evaporated having an index of refraction of about 2 or more.

The films of low index of refraction consisted of quartz and of the metallic fluorides. It is to be noted here that the zero reflection in the case of the fluorides is not achieved by artificially reducing their indices of refraction by making them porous: all the films are preferably made as dense as possible so as to gain ruggedness.

The invention is more specifically described in the following, taken with the accompanying drawing, in which latter Fig. 1 is a diagrammatic representation of a glass plate bearing on one surface thereof a first film topped by a second film;

Fig. 2 represents the graphical addition of the amplitudes of three light waves; and Fig. 3 represents a different graphical addition of the amplitudes of three light waves.

There are many ways in which more than two reflected amplitude vectors can be added to give zero reflection for a particular wave length. An example illustrating the general method for a multifilm consisting of a high index film next to the glass followed by a lower index film follows:

The requirement for zero reflection is that the indices and the film thicknesses be chosen so that $$A_{a-2} + A_{2-1} + A_{1-g} = 0$$

where the A's are vector quantities (see Figure 1).

As a numerical example, let $N_g = 1.50$, $N_1 = 2.00$, and $N_2 = 1.40$; then $A_{a-2} = 0.167$, $A_{2-1} = 0.176$, and $A_{1-g} = 0.143$. These vectors may be added to zero for any desired wave length, $\lambda_0$ as shown in Fig. 2.

For this particular example assuming $\lambda_0 = 5500$ A, the optical thickness, $N_1 d_1$, of the first film as given by $\theta_1 = 2\pi 2 N_1 d_1 / \lambda_0$ is about 2300 A and the optical thickness, $N_2 d_2$, of the second film is about 1000 A. For wave lengths both greater and smaller than $\lambda_0$, the reflection increases somewhat, but it will be substantially reduced for a sufficiently broad range of wave lengths to suit many photographic and visual purposes. The reflected light is given by the formula:

$$R = (A_{a-2} + A_{2-1} + A_{1-g})^2$$

where the A's are added as vectors. The angles $\theta_1$ and $\theta_2$ between them are in general $$\theta_1 = 2\pi \cdot 2 N_1 d_1 / \lambda$$

and $$\theta_2 = 2\pi \cdot 2 N_2 d_2 / \lambda$$

$\theta_2$ is the angle between vector $A_{a-2}$ and vector $A_{2-1}$. $\theta_1$ the angle between vector $A_{2-1}$ and vector $A_{1-g}$.

It is interesting to note that in this example R will increase to a maximum value of about 2% in the ultra-violet around 4000 A and then again decrease to practically zero further in the ultra-violet around 3000 A. This behavior is different than for a single film.

The dispersion of the film (i. e., N is a function of $\lambda$) has been neglected for simplicity. Its effect is relatively small and can sometimes be used to advantage.

In this numerical example, the three vectors can also be added to zero as shown in Fig. 3. In Fig. 2 the optical thickness of the first film was the greater. In Fig. 3 it is the opposite.

From Figs. 2 and 3 it is clear that either or both $\theta_1$ and $\theta_2$ can be increased by multiples of $2\pi$ (360 degrees) by increasing the optical thickness of a film by multiples of $\lambda_0/2$. This has the effect of narrowing the spectral region in which reflection is substantially eliminated.

From the foregoing equations and graphical illustration it follows that the reflection is practically eliminated for a greater spectral range by choosing film materials such that index $N_1$ is greater and $N_2$ is smaller than in the example.

It has been assumed in the above that the films are transparent so that the decrease in reflection is completely added to the transmitted light. It is also possible to eliminate reflection by the methods herein described by the use of films which are partially absorbing. In such case the reflected amplitude vectors are slightly changed in magnitude and direction when absorption is taken into account, by the known optical laws. Our research indicates that films which absorb in the violet and ultra-violet are or may be useful for eye glasses.

The above disclosure has for simplicity been limited to the use of two films, but the general method is of course applicable to any number of films for which the reflected amplitude vectors add so as to result in a diminution of reflection. For many purposes it would not be necessary for the vectors to add to zero.

The use of more than one film might also be simultaneously employed for other purposes than reducing reflection or adding to transmission or both. For example, a film may be used for protecting underlying films or a film may be used to bind other films together or to the glass.

Shown in the immediately following table are results data of several specific combinations, including materials employed (noted in the order of their evaporation onto the glass), the R (=reflectance) and T (transmission) for the extremes of the visible spectrum as well as the wave length where R is a minimum:

| Exp. No. | Materials employed | At 400 mμ | Point of minimum reflectance | At 700 mμ |
|---|---|---|---|---|
| 43A | Cryolite+AgCl | R—4.0% | R—1.0% at 430 mμ | R—27.0% |
| 44A | MgF₂+NaF+MgF₂ | R—1.0% |  | R—3.0% |
| 49A | Cryolite+Sb₂S₃ | R—18.0% | R—5.0% at 510 mμ | R—36.0% |
| 68 | ZnS+MgF₂ | R—11.0% <br> T—70.0% | R—3.0% at 500 mμ <br> T—81.0% | R—7.0% <br> T—80.0% |
| 72 | As₂S₅+MgF₂ | R—2.5% <br> T—87.5% | R—0.2% at 500 mμ <br> T—95.5% | R—1.0% <br> T—95.0% |
| 79a | ZnS+SiO₂ | R—5.0% <br> T—86.0% | R—1.5% at 480 mμ <br> T—92.0% | R—5.5% <br> T—89.0% |
| 80a | ZnS+SiO₂ | R—8.0% <br> T—80.0% | R—0.2% at 500 mμ <br> T—92.0% | R—5.0% <br> T—90.0% |
| 101 | Sb₂S₃+MgF₂ | R—15.0% <br> T—50.0% | R—0.6% at 560 mμ <br> T—91.0% | R—2.0% <br> T—92.0% |
| 103 | SnO₂+cryolite | R—2.0% <br> T—93.0% | R—0.1% at 520 mμ <br> T—95.5% | R—0.5% <br> T—94.0% |

ZnS+NaF+ZnS+NaF    R—26.5%    R max. 85%    R— 8.0%
                      T—57.0%    at 550 mμ    T—89.0%
                                       T—10%

The last example illustrates use of the process for increasing the maximum selective reflection from a surface.

Of the above double films, those of ZnS+SiO₂ and Sb₂S₃+MgF₂ were hardest and most rugged: each of these combinations can be baked to advantage, to confer thereupon improved resistance to water and abrasion. All of the combinations given above had, without baking or other after treatment, sufficient ruggedness to withstand vigorous brushing with a soft brush.

In connection with the values for "T" in the data of the above table, it is noted that the glass plates used in the respective tests were film coated on one side only. Accordingly, a perfect transmission value under these tests could not have exceeded 96%. Two of the tests above showed transmission of 95.5%, or 99.5% of the theoretical maximum.

A particularly rugged multiple film coating in accordance with the present invention consisted of: (1) a film—a few atom layers thick—of chromium which was then oxidized by exposure to air, (2) a film of aluminum oxide (sapphire) a little more than $\lambda_0/4$ in thickness and (3) a film of quartz a little less than $\lambda_0/4$ in thickness. This multiple film could not be scratched by the finger-nail and withstood washing with water and soap. The reflectivity in the region most sensitive to the eye was about 0.6% and increased to about 4.0% at the violet and to about 2.0% at the red.

It is noted from the data of the table above that when the film next to the glass had a lower index of refraction than that of the top film, reflectances throughout the visible spectrum were high. Also it is noted that a multiple film giving low minimum reflectance in a very limited spectral range only with high general reflectance was produced by applying to a glass plate a multiplicity of layers (e. g., a zinc sulphide and sodium fluoride, alternately).

Control of film thicknesses in multiple films may be effected in a variety of ways. Thus, when employing the evaporative method for applying the films, we may proceed as follows:

When making a single film using a given substance and selected evaporating conditions, the only variable is the thickness of the film.

We may determine the correct distance from the heater (i. e., evaporator) to the plate being coated, to give the correct optical thickness by making a trial evaporation in the form of a wedge on a glass plate inclined at an angle to the direction: heater—plate. Since one edge of the plate is nearer the heater, it receives a thicker film deposit than the other, with gradual change from thicker to thinner from the nearer edge to the farther edge (hence the "wedge"). In making this preliminary study, it is desirable that the wedge angle be made as small as possible, in order to be able to apply the obtained findings to the uniform coating of a plate where the angle of incidence of the vapors is essentially zero, because of the observation that the index of refraction of a film apparently is a function of the angle of impact of the vapors (the index decreasing with increasing angle of incidence).

On the "wedge" one can, by inspection or by measurement, pick out the particular position or thickness of layer which gives the desired reflectance for any preselected wave length of light. Knowing the location of the "wedge" with respect to the heater one can determine at what distance one should place the specimen for correct coating under the selected conditions using a given amount of material.

The thicknesses of the layers in a double film can be determined by an extension of the "wedge" test above, to wit, a "crossed wedge" test. Thus, we may carry out the trial evaporation on a rectangular glass plate, calling one edge the $x$-axis and an adjacent edge the $y$-axis. The substance which is to be next to the glass is evaporated in a wedge with, say, the thick end of the wedge along the $x$-axis. The trial plate is then turned 90° in its own plane, and the second substance is evaporated, onto the same side of the plate, as a "wedge" with its thick end along the $y$-axis. The resultant is the "crossed wedge" product on which one can find every combination of thicknesses of the two films within the limits imposed by the maxima and minima of the component wedges. The position "$x, y$" of minimum (or maximum) reflection can readily be found by inspection or measurement. Accordingly, we can—just as in the case of the simple wedge test for a one component film—determine the correct amount of material to be evaporated for a certain distance (heater-specimen) for each film, or, in the alternative, the correct distance for a selected amount of material.

To summarize, the proper thicknesses for the components of a double film may be determined as follows:

(1) The approximate thicknesses are calculated from the known indices of the two substances in the massive forms, some account being taken of the fact that the film indices will, in general, be lower than the massive indices:

(2) A "crossed wedge" test is then made, using selected conditions. Amounts of materials evaporated are noted.

(3) The position, on the crossed wedge, of the point (or zone) of minimum reflection gives the amount of material to be evaporated for the selected evaporation distance.

It will be apparent that one may, if desired, modify the above test method to determine the correct time of evaporation of each substance to be evaporated.

The "crossed wedge" information can also be made use of in the following manner. We may measure the first "wedge" for reflecting power before the top film is applied. When the second "wedge" is added, and the position of minimum reflectance is located on the crossed wedges, the corresponding reflectance of the lower film per se is known, and the plates to be coated uniformly (as in regular production) may be given their first films accordingly. That is to say, they are built up until the pre-selected reflecting powers are reached, monitoring being carried out photometrically. Then, in the second evaporations, the top films are built up until the reflectances of the summations of the layers become minima (or, more broadly expressed, until the desired final reflecting powers are reached).

This application contains subject-matter in common with our application Serial No. 247,974, filed December 27, 1938.

We claim:

1. In the method of treating a normally partially light-reflective surface of a solid light-transmitting optical element to reduce the light-reflectance thereof which involves applying to said surface a light-transmitting layer, of a normally solid and stable inorganic substance, having an optical thickness and an effective index of refraction adapted to reduce reflection of light from said surface, the improvement which consists in forming said layer from at least two successively applied light-transmitting films of dissimilar normally solid and stable inorganic substances having indices of refraction differing from each other and from that of the material constituting the light-transmitting optical element, the substance constituting the film which is adjacent the surface of the optical element having a higher index of refraction than that of the substance constituting the outer film, and selecting such optical thicknesses for the films that the sum of the reflected amplitude vectors from the films and from the surface of the optical element is substantially zero.

2. In the method of treating a normally partially light-reflective surface of a solid light-transmitting optical element to reduce the light-reflectance thereof which involves evaporatively depositing onto said surface a light-transmitting layer, of normally solid and stable inorganic substance, having an optical thickness and an effective index of refraction adapted to reduce reflection of light from said surface, the improvement which consists in forming said layer from at least two successively evaporatively deposited light-transmitting films of dissimilar normally solid and stable inorganic sustances having indices of refraction differing from each other and from that of the material constituting the light-transmitting optical element, the substance constituting the film which is adjacent the surface of the optical element having a higher index of refraction than that of the substance constituting the outer film, and selecting such optical thicknesses for the films that the sum of the reflected amplitude vectors from the films and from the surface of the optical element is substantially zero.

3. The method defined in claim 1, in which the coating substance for the first-formed film is zinc sulphide and in which the coating substance for the second-formed film is magnesium fluoride.

4. Method of treating a normally partially light-reflective surface of a solid light-transmitting optical element to reduce the light-reflectance thereof, which comprises evaporating onto the surface a film of chromium metal a few molecule layers thick and thereafter oxidizing the chromium deposit, forming on the so-prepared surface a film of aluminum oxide, said film having an optical thickness slightly in excess of 1250 Å, and forming on the film coated surface a film of quartz said quartz film having an optical thickness slightly less than 1250 Å.

5. An optical element exhibiting low reflectance of light of preselected wave-length and comprising a solid light-transmitting body portion having a surface normally partially reflective to said light and on said surface a layered deposit of a normally solid and stable inorganic substance said layered deposit having an optical thickness and an effective index of refraction adapted to reduce reflection of light from said surface, characterized in that the deposit is formed of at least two laminated films of dissimilar normally solid and stable inorganic substances, having indices of refraction differing from each other, the substance constituting the film adjacent said surface having a higher index of refraction than that of the substance constituting the outer film and than that of the material constituting the body portion of the optical element, the optical thicknesses of the films being such that the sum of the reflected amplitude vectors from the films and from the surface of said body portion is substantially zero.

6. The optical element defined in claim 5, in which the substance constituting the underlying film is zinc sulphide and the substance constituting the outer film is magnesium fluoride.

7. The optical element defined in claim 5, in which the substance constituting the underlying film is aluminum oxide, the film having an optical thickness in excess of 1250 Å, and the substance constituting the outer film is silicon dioxide, the film having an optical thickness slightly less than 1250 Å.

8. In the method of treating a normally partially light-reflective surface of a solid light-transmitting optical element to reduce the light-reflectance thereof which involves applying to said surface a light-transmitting layer, of a normally solid and stable inorganic substance, having an optical thickness and an effective index of refraction adapted to reduce reflection of light from said surface, the improvement which consists in forming said layer from at least two successively applied light-transmitting films of dissimilar normally solid and stable inorganic substances having indices of refraction differing from each other, the substance constituting the film which is adjacent the surface of the optical element having a higher index of refraction than that of the substance constituting the outer film and than that of the material constituting the light-transmitting optical element, and selecting such optical thicknesses for the films that the sum of the reflected amplitude vectors from the films and from the surface of the optical element is substantially zero.

9. Method of treating a normally partially light-reflective surface of a solid light-transmitting optical element to reduce the light-reflectance thereof, which comprises evaporatively depositing over said surface a light-transmitting film of a normally solid and stable coating substance selected from the group consisting of inorganic salts of metals and metallic oxides which are capable of forming substantially transparent specularly reflective films, evaporatively depositing on the film-coated surface a second light-transmitting film of a dissimilar normally solid and stable coating substance selected from the group of inorganic salts of metals and metallic oxides which are capable of forming substantially transparent specularly reflective films, the two coating substances having indices of refraction which differ from each other, the coating substance for said first film being selected to provide a film having a higher index of refraction than that of the coating substance constituting the second film and than that of the material constituting said optical element, and so controlling the deposition of the two films as to their optical thicknesses and indices of refraction that the sum of the reflected amplitude vectors from the two films and from the surface of the optical element is substantially zero.

CHARLES HAWLEY CARTWRIGHT.
ARTHUR FRANCIS TURNER.